(12) United States Patent
Olsen et al.

(10) Patent No.: US 7,425,099 B1
(45) Date of Patent: Sep. 16, 2008

(54) SYSTEMS AND METHODS FOR MODIFYING SELECTED PORTION OF OPTICAL FIBER MICROSTRUCTURE

(75) Inventors: Jorgen Ostgaard Olsen, Copenhagen (DK); Torben Erik Veng, Roskilde (DK)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 11/733,571

(22) Filed: Apr. 10, 2007

(51) Int. Cl.
*G02B 6/255* (2006.01)

(52) U.S. Cl. .............................. 385/96; 385/95; 385/123; 385/124; 385/125; 385/126

(58) Field of Classification Search ................. 385/95, 385/96, 123–126
See application file for complete search history.

(56) References Cited

U.S. PATENT DOCUMENTS 6,987,783 B2 * 1/2006 Fajardo et al. ................. 372/6
7,039,076 B2 * 5/2006 Kane et al. ..................... 372/6

* cited by examiner

*Primary Examiner*—Jennifer Doan
(74) *Attorney, Agent, or Firm*—Jacob & Kim LLP; Daniel Kim, Esq.

(57) ABSTRACT

An air-clad optical fiber is provided having a core that is surrounded by an inner cladding region, an air-clad region, and an outer region. A lead end of the air-clad optical fiber is prepared for splicing by removing the air-clad region and all fiber regions outside of the air-clad region, so as to expose an inner fiber region. The prepared lead end of the air-clad optical fiber is then spliced to a lead end of the optical device. The air-clad region may be removed from a selected portion of an air-clad fiber by causing an etchant gas to stream through the air-clad region in the selected portion of the fiber. Heat is then applied to the selected fiber portion, causing at least some of the microstructure to be etched away.

26 Claims, 14 Drawing Sheets

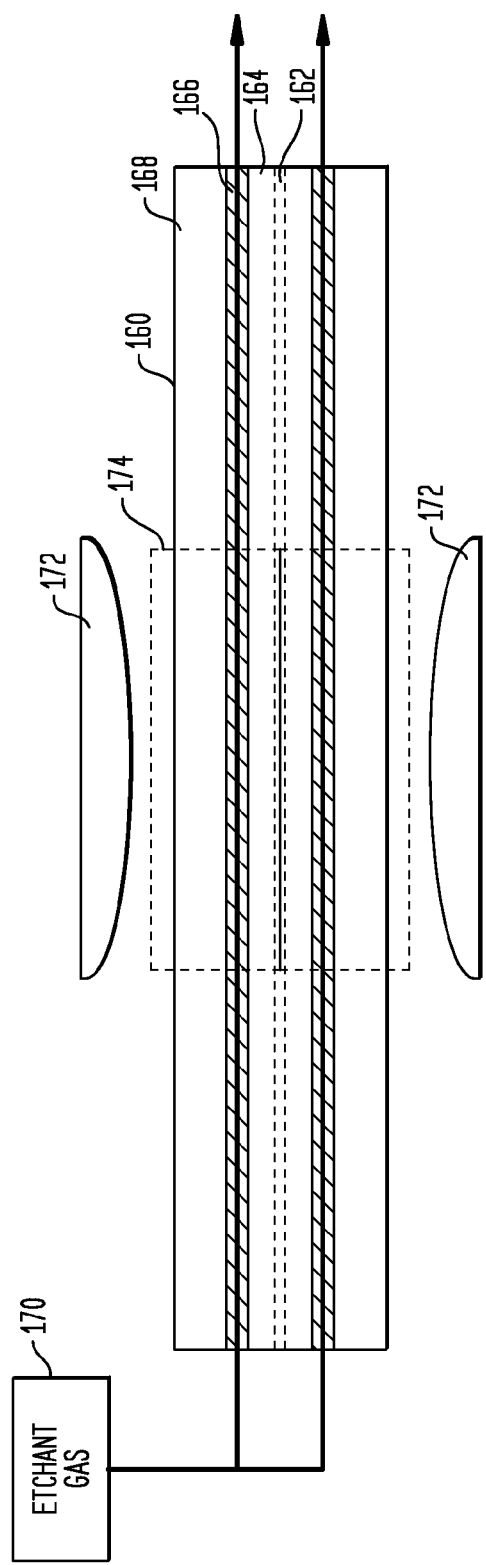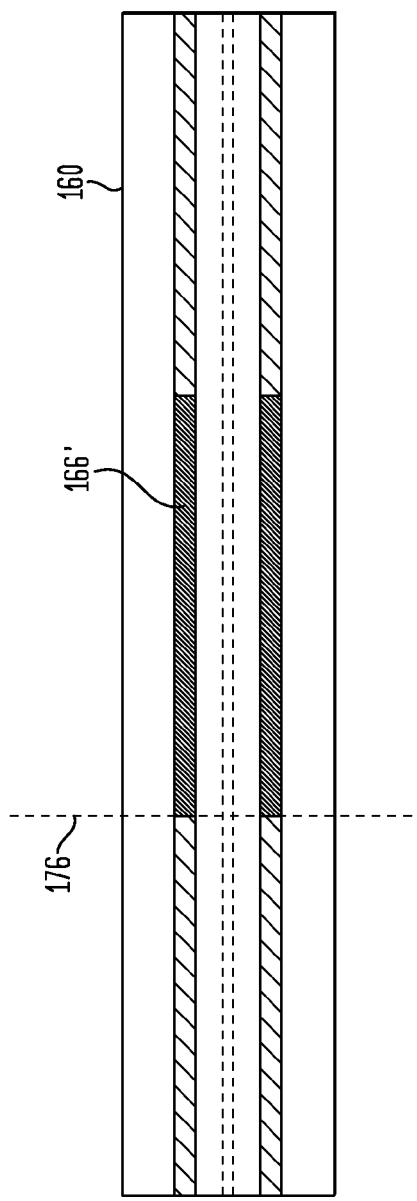

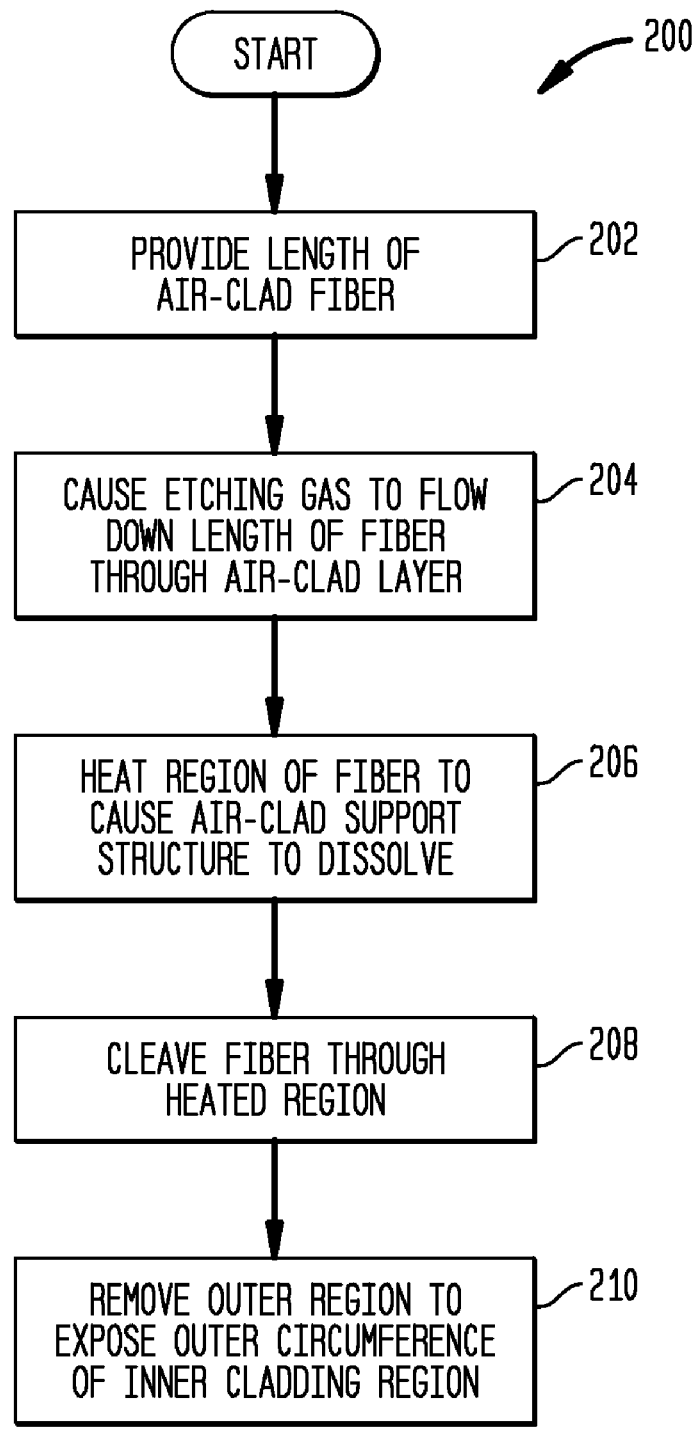

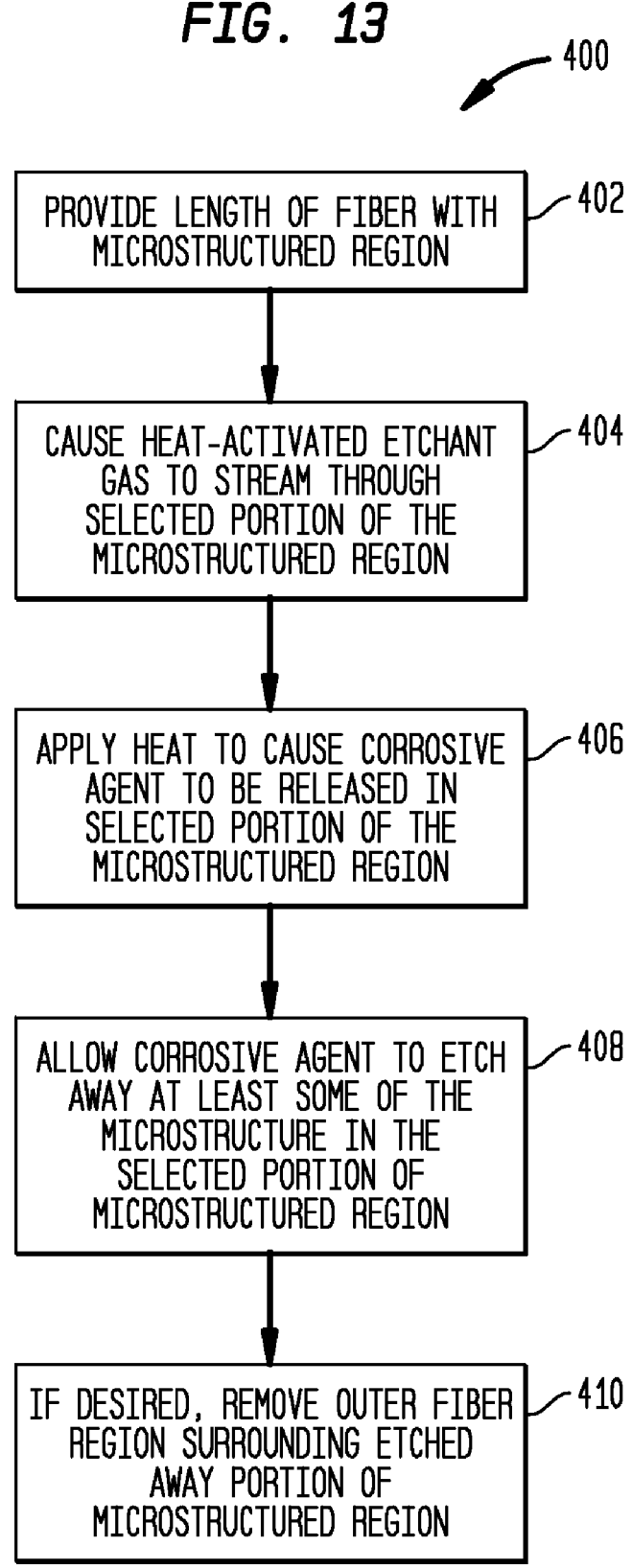

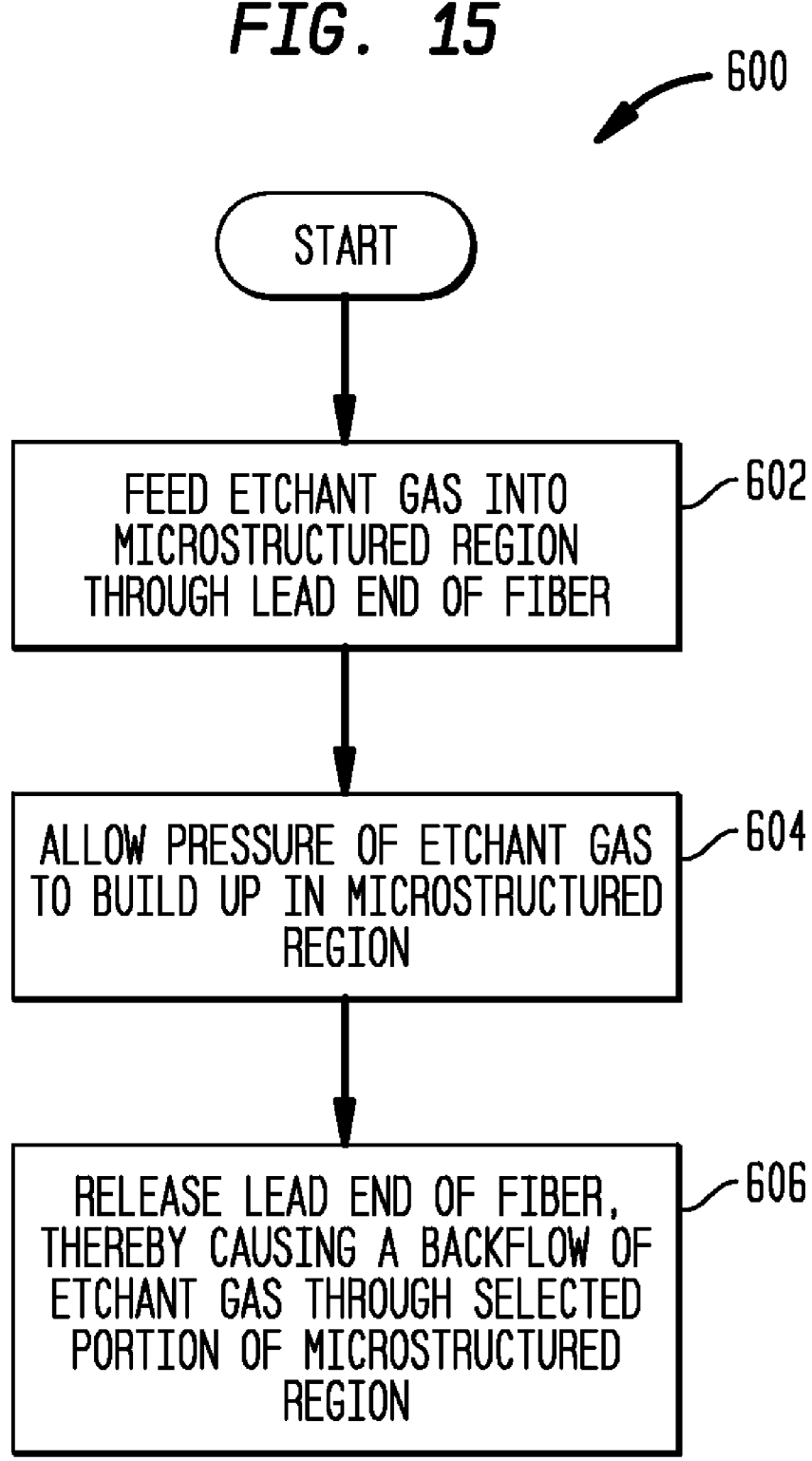

SYSTEMS AND METHODS FOR MODIFYING SELECTED PORTION OF OPTICAL FIBER MICROSTRUCTURE

BACKGROUND OF THE INVENTION

1. Field of the Invention

The present invention relates generally to optical fiber devices and methods, and in particular to improved systems and methods for modifying a selected portion of an optical fiber microstructure.

2. Description of Prior Art

Optical fibers containing microstructured regions can be used in a number of different applications. For example, some optical pumping schemes may employ an air-clad fiber, which is a type of microstructured fiber having an inner waveguide and an outer waveguide. The inner waveguide can be used to transmit the optical data signal, and the outer waveguide can be used to transmit the optical pumping signal. However, the use of an air-clad fiber in a pumping scheme has proven to be problematic. If a fusion splicing process is used to couple an optical device to an air-clad fiber, the heat used for splicing typically causes the microstructured air-clad region in the air-clad fiber to collapse. The collapse of the air-clad region causes the pumping signal to leak out of the outer waveguide.

SUMMARY OF THE INVENTION

The above-described issues, and others, are addressed by the present invention, an aspect of which provides a technique for modifying a selected portion of an optical fiber microstructure, such as the air-clad region in an air-clad fiber. An etchant gas is caused to stream the microstructure in a selected portion of the fiber. Heat is then applied to the selected fiber portion, causing at least some of the microstructure to be etched away. If desired, the outer region of the fiber surrounding the etched away portion of the microstructure may be removed to expose an inner fiber region.

A further aspect of the invention provides a technique for coupling an optical device to a modified air-clad optical fiber. According to this technique, an air-clad optical fiber is provided having a core, an inner cladding region surrounding the core, an air-clad region surrounding the inner cladding region, and an outer region surrounding the air-clad region. A lead end of the air-clad optical fiber is prepared for splicing by removing the air-clad region and all fiber regions outside of the air-clad region, so as to expose an inner fiber region. The prepared lead end of the air-clad optical fiber is then spliced to a lead end of the optical device.

Additional features and advantages of the present invention will become apparent by reference to the following detailed description and accompanying drawings.

BRIEF DESCRIPTION OF THE DRAWINGS

FIGS. 8A-8D are a series of drawings illustrating a technique according to a further aspect of the invention for preparing the lead end of an air-clad fiber for coupling to an optical device.

FIG. 9 shows a flowchart of a method for preparing the lead end of an air-clad fiber for coupling to an optical device in accordance with the technique illustrated in FIGS. 8A-8D.

FIG. 13 is a flowchart illustrating a general technique according to a further aspect of the invention for etching away a selected portion of a microstructured region in an optical fiber.

FIG. 15 is a flowchart of an overall technique for creating a backflow of etchant gas through a selected portion of a microstructured region in an optical fiber.

DETAILED DESCRIPTION

Figure 1:
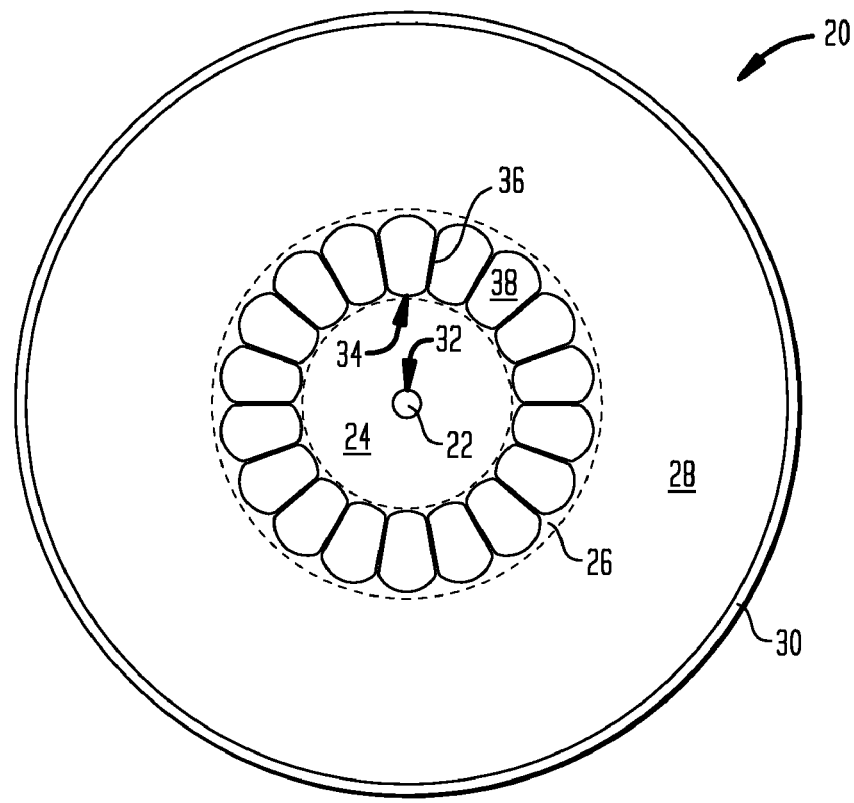
FIG. 1 shows a cross section diagram of a representative air-clad fiber according to the prior art.

Aspects of the present invention are directed to techniques for modifying a selected portion of an optical fiber microstructure, such as an air-clad region in an air-clad optical fiber. There is first described an aspect of the invention according to which a modified air-clad fiber is advantageously used as part of an optical pumping scheme. There is further described a general technique for modifying a microstructured optical fiber by etching away some, or all, of the microstructure in a selected portion of the fiber. It will be appreciated from the presently described techniques may be advantageously employed in a number of different contexts beyond the examples set forth herein.

In an optical pumping scheme, a pump laser generates a beam of coherent light having a minimum cross section area $A_{source}$ and a source numerical aperture $NA_{source}$, also referred to as the beam's "divergence." Equation (1) sets forth the mathematical relationship of these two quantities:

$$NA_{source} \cdot \sqrt{A_{source}} = \text{constant} \qquad (1)$$

Thus, pursuant to Equation (1), it will be understood that a reduction of the cross section area $A_{source}$ of the pumping beam will result in an increase in the beam's divergence.

In order for the pump laser output to be captured by an optical transmission fiber, the divergence of the pump laser output cannot exceed the transmission fiber's numerical aperture $NA_{fiber}$. The numerical aperture $NA_{fiber}$ of an optical fiber waveguide is determined by the respective refractive indices $n_1$ and $n_2$ of the adjacent fiber regions forming the waveguide, as set forth in the following Equation (2):

$$NA_{fiber} = \sqrt{n_1^2 - n_2^2} \quad (2)$$

Using current materials and manufacturing techniques, there is a limit to the amount of difference achievable between refractive indices $n_1$ and $n_2$ in a typical optical fiber design having a single waveguide formed by a core region surrounded by a solid cladding region. Thus, there is a limit to maximum $NA_{fiber}$ achievable using this type of fiber.

In order for a pumping signal and a data signal to be transmitted along the same waveguide, the pump laser must generate a light beam that, when reduced to a suitable cross section area $A_{source}$, has a divergence $NA_{source}$ that is sufficiently small to allow the pumping signal to be captured by the same waveguide used to capture the data signal. However, pump lasers capable of generating such a beam can be quite expensive, and for that reason are generally not practical.

Air-clad fibers have been developed that include two concentric waveguides, one inside of the other. The inner waveguide has a relatively small cross section area, and has a relatively small numerical aperture that is sufficient to capture an optical data signal. The outer waveguide has a relatively large cross section area, and has a numerical aperture that is significantly larger than that of the inner waveguide. Thus, the outer waveguide is capable of capturing a pumping signal having a relatively large divergence.

In an air-clad fiber, the outer waveguide is formed by using a specially designed cladding layer that is mostly air, and that therefore has a refractive index that is significantly lower than the refractive index of a typical fiber region fabricated from solid silica, or other material. Thus, a waveguide may be formed by surrounding a solid fiber region with an air-clad layer. Because of the low refractive index of the air-clad layer, it is possible to construct a waveguide having a relatively large numerical aperture.

FIG. 1 shows a cross section, not drawn to scale, of an air-clad fiber 20 according to the prior art. The depicted air-clad fiber 20 is generally representative of an air-clad fiber that is commercially available from OFS Specialty Photonics Division (www.specialtyphotonics.com). The fiber 20 comprises a plurality of concentric regions: a core region 22, an inner cladding region 24, an air-clad region 26, an outer cladding region 28, and a protective outer coating 30. The core region 22, inner cladding region 24, and outer cladding region 28 are fabricated from solid silica. One or more of these regions are chemically doped to achieve a desired refractive index. The air-clad region 26, described below in further detail, is mostly air, and therefore has a refractive index approaching 1.0. The protective outer coating 30 is fabricated from a suitable polymer material.

As used herein, the term "cladding region" refers to a fiber region having one or more cladding layers. In the present example, inner cladding region 24 and outer cladding region 28 each include a single cladding layer. However, it will be apparent from the present discussion that the present invention also applies to air-clad fibers having inner or outer cladding regions having more than one cladding layer. As further used herein, the term "outer region" generally refers to all fiber components located outside of the periphery of air-clad layer 26. These components include the outer cladding region 28 and outer protective coating 30.

Figure 2:
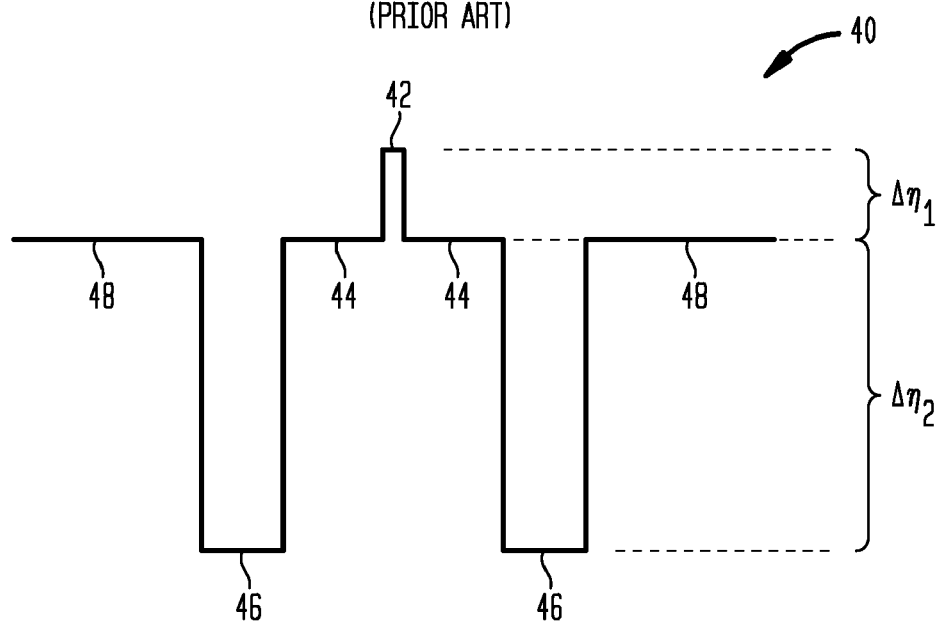
FIG. 2 shows a refractive index profile for the fiber shown in FIG. 1.

FIG. 2 shows a refractive index profile 40, not drawn to scale, illustrating the refractive index of each region of the fiber 20 along a diameter extending across the fiber 20. From FIGS. 1 and 2, it will be seen that the fiber 20 has a step-index design. However, it will be appreciated that the present invention may also be practiced with a graded-index fiber design.

Figure 3A:
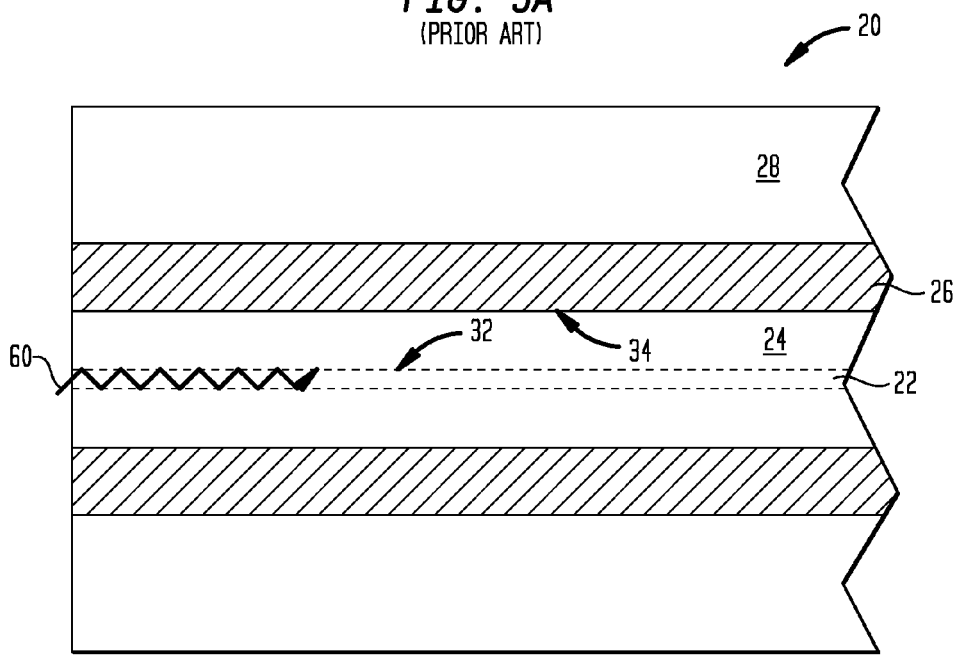
FIGS. 3A and 3B show axial cross sections of the fiber shown in FIG. 1 illustrating, respectively, the propagation of an optical data signal down the fiber's inner waveguide and the propagation of an optical pumping signal down the fiber's outer waveguide.

The FIG. 2 refractive index profile 40 includes a central spike 42 corresponding to core region 22, and a pair of "shoulders" 44 corresponding to inner cladding region 24. The difference between the core region refractive index 42 and the inner cladding region refractive index 44 is referred to herein as $\Delta n_1$. The interface between core region 22 and inner cladding region 24 forms an inner waveguide 32 having a numerical aperture $NA_{inner}$ that is suitable for capturing an optical data signal. FIG. 3A shows an axial cross section of fiber 20 illustrating the propagation of an optical data signal 60 along the inner waveguide 32.

Figure 3B:
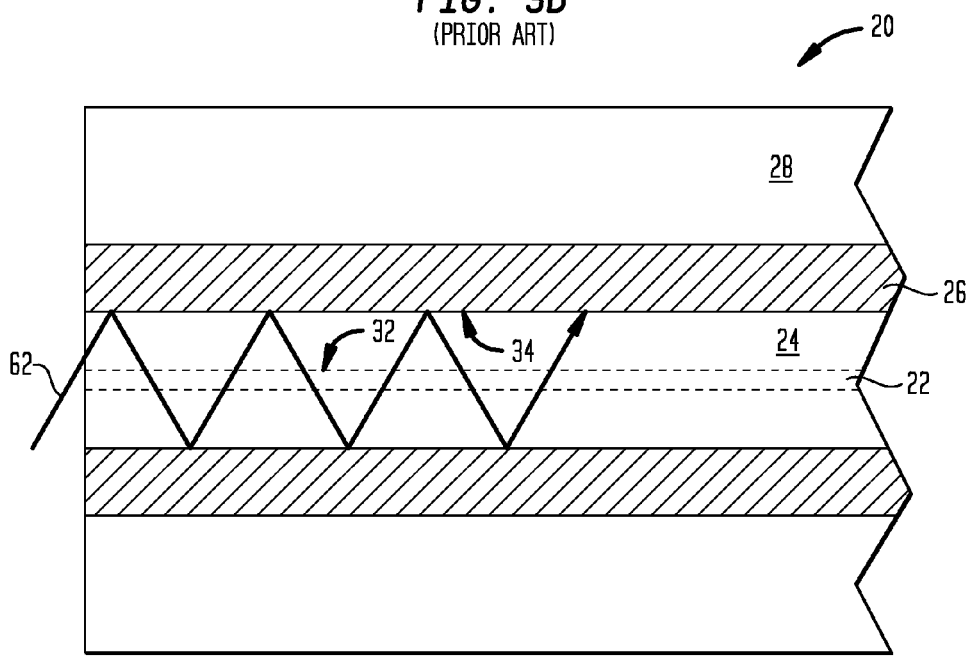

The FIG. 2 refractive index profile 40 further includes a pair of "trenches" 46 corresponding to air-clad region 26. The reason that the refractive index of the air-clad layer 26 is so low is that it is composed mostly of air, which has a refractive index close to 1.0. The difference between the inner cladding region refractive index 24 and the air-clad region refractive index is referred to herein as $\Delta n_2$. The interface between the inner cladding region 24 and the air-clad layer 26 forms an outer waveguide 34 having a numerical aperture $NA_{outer}$ that is suitable for capturing an optical pumping signal. FIG. 3B shows an axial cross section of fiber 20 illustrating the propagation of an optical pumping signal 62 along the outer waveguide 34.

The refractive index profile 40 further includes a pair of flat regions 48 corresponding to the outer cladding region 28. In the present example, the outer cladding region refractive index 48 is equal to the inner cladding region refractive index 44. However, depending upon the particular air-clad fiber design, these values may be different.

There is now briefly described the construction of the air-clad region 26 in fiber 20. A number of different structures may be used to construct an air-clad region. In the present example, the air-clad layer 26 comprises a webbed supporting structure that includes a plurality of web elements 36 that extend between the outer circumference of the inner cladding region 24 and the inner circumference of the outer cladding region 28. The web elements 36 define a plurality of hollow channels 38 extending down the length of the fiber 20.

As described in U.S. Pat. No. 5,907,652, the air-clad layer 26 shown in FIG. 1 may be fabricated by using a multi-step process. A modified chemical vapor deposition (MCVD) technique is used to fabricate a solid core region of an optical fiber preform. There is then added to the preform a plurality of capillary tubes that surround the core region, and an outer cladding tube surrounding the capillary tubes. When drawn into optical fiber, each individual capillary tube forms a separate channel 38 extending down the length of the fiber. The walls of the capillary tubes form the web elements 36 in the finished fiber.

If the air-clad fiber 20 is cleaved such that the channel openings 38 are exposed at first and second ends of the cleaved fiber 20, it is possible to cause a gas to flow down the length of the fiber 20 between the first and second ends. As used herein, the term "gas-conducting" refers to an air-clad fiber design, or other design including a microstructured region, that allows a gas to be conducted down the length of the fiber through the air-clad region, or other microstructured region. It will be appreciated from the present discussion that various aspects of the present invention are applicable to other types of fibers including various types of microstructured regions, both gas-conducting and non-gas-conducting.

As discussed above, an air-clad fiber may be used in an optical pumping scheme. It is desirable for the optical data signal and the optical pumping signal to be coupled at the same time, respectively, to the inner and outer waveguides of the air-clad fiber. A fiber-based solution has been developed that achieves the desired coupling without the use of bulk optics.

Figure 4:
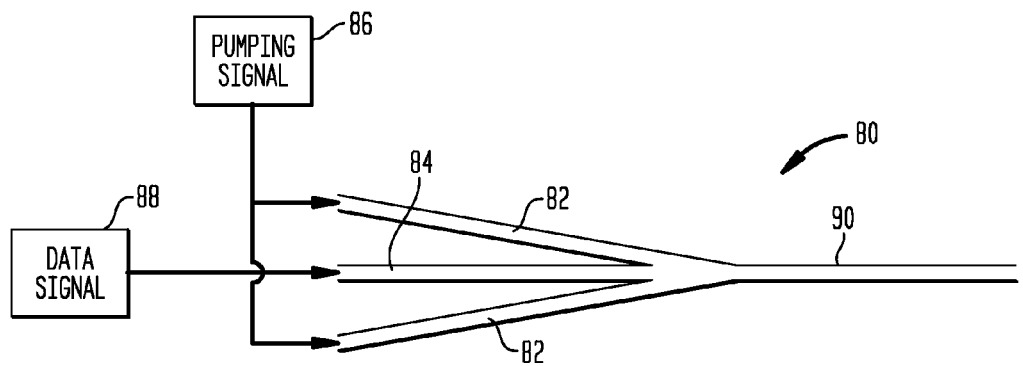
FIG. 4 shows a diagram of a tapered fiber bundle according to the prior art.

FIG. 4 shows a cross section diagram of a fiber-based signal and pump combiner 80, known as a "tapered fiber bundle" (TFB). TFB 80 includes inputs 82 and 84 for a pumping signal 86 and a data signal 88, which are pulled down into a single output fiber 90. The output fiber 86 typically contains a core for guiding the data signal. The pumping signal 86 is guided by the cladding of the output fiber 90, since the fiber 90 is coated with a coating having a lower refractive index than the cladding.

Figure 5:
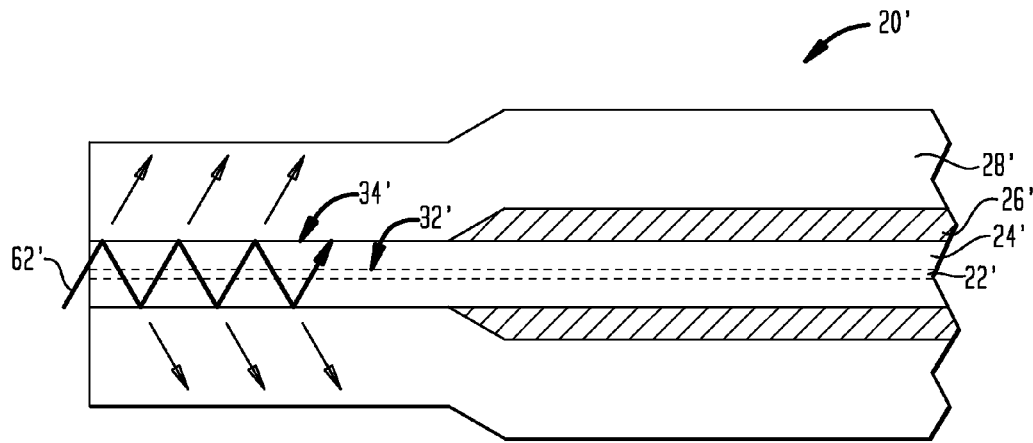
FIG. 5 shows a diagram of the fiber shown in FIG. 1 after splicing heat has caused the collapse of the air-clad layer in the lead end of the fiber.

It would be desirable to be able to use a fusion splicing technique to couple a TFB to an air-clad fiber. However, when the air-clad fiber is heated during splicing, the air-clad layer typically collapses. FIG. 5 shows a cross section diagram of the collapsed fiber 20'. Returning to the refractive index profile 40 shown in FIG. 2, it will be seen that the collapse of the air-clad layer 26' eliminates the trenches 46 in the refractive index profile 40. This causes $\Delta n_2$ to drop significantly in value. The result is that some or all the pumping signal 62' will now leak out of the outer waveguide 34'.

Figure 6:
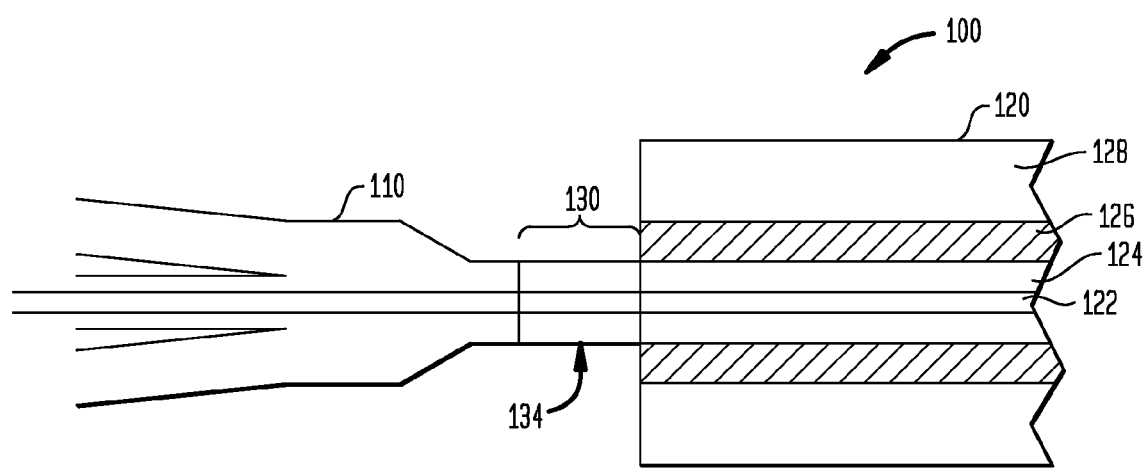
FIG. 6 shows a diagram of a fiber coupling scheme according to an aspect of the invention, in which a tapered fiber bundle is coupled to a prepared lead end of an air-clad optical fiber.

FIG. 6 shows a cross section diagram of a coupling scheme 100 according to an aspect of the present invention, in which a TFB 110 is fusion spliced to an air-clad fiber 120 that has been prepared for splicing in accordance with the techniques described below. The air-clad fiber 120 includes a core region 122, an inner cladding region 124, an air-clad region 126, an outer cladding region 128, and an outer protective coating (not shown). In the FIG. 6 coupling scheme, the lead end of the air-clad fiber 120 includes a "stripped" portion 130 that is formed, prior to splicing, by removing the air-clad region 126 and all fiber regions outside of the air-clad region 126, to expose the outer periphery of the inner cladding region 124 to ambient atmosphere.

Because the air-clad region 126 has a refractive index substantially equal to the refractive index of ambient atmosphere, it will be seen that stripping away the regions of the fiber outside of the inner cladding region 124 will substantially preserve the numerical aperture of the outer waveguide 134. As discussed above, in the air-clad fiber 120, the outer waveguide is formed by the interface between the inner cladding region 124 and the air-clad region 126. In the stripped portion 130, the outer waveguide is formed by the interface between the inner cladding region 124 and ambient atmosphere.

Once its outer region has been stripped away, the lead end of the air-clad fiber is then fusion spliced to the TFB 110. Because there is no longer an air-clad region outside of the inner cladding 124, there is nothing to collapse during the fusion splicing process. Thus, the depicted coupling scheme results in a significant decrease in the amount of pumping signal leakage.

It should be noted that although the present techniques are described in the context of coupling an air-clad fiber to a TFB, the described techniques may also be used to couple an air-clad fiber to other types of fibers and optical devices. For example, the described techniques may be used to fusion splice a length of an air-clad fiber to another length of air-clad fiber.

Figure 7:
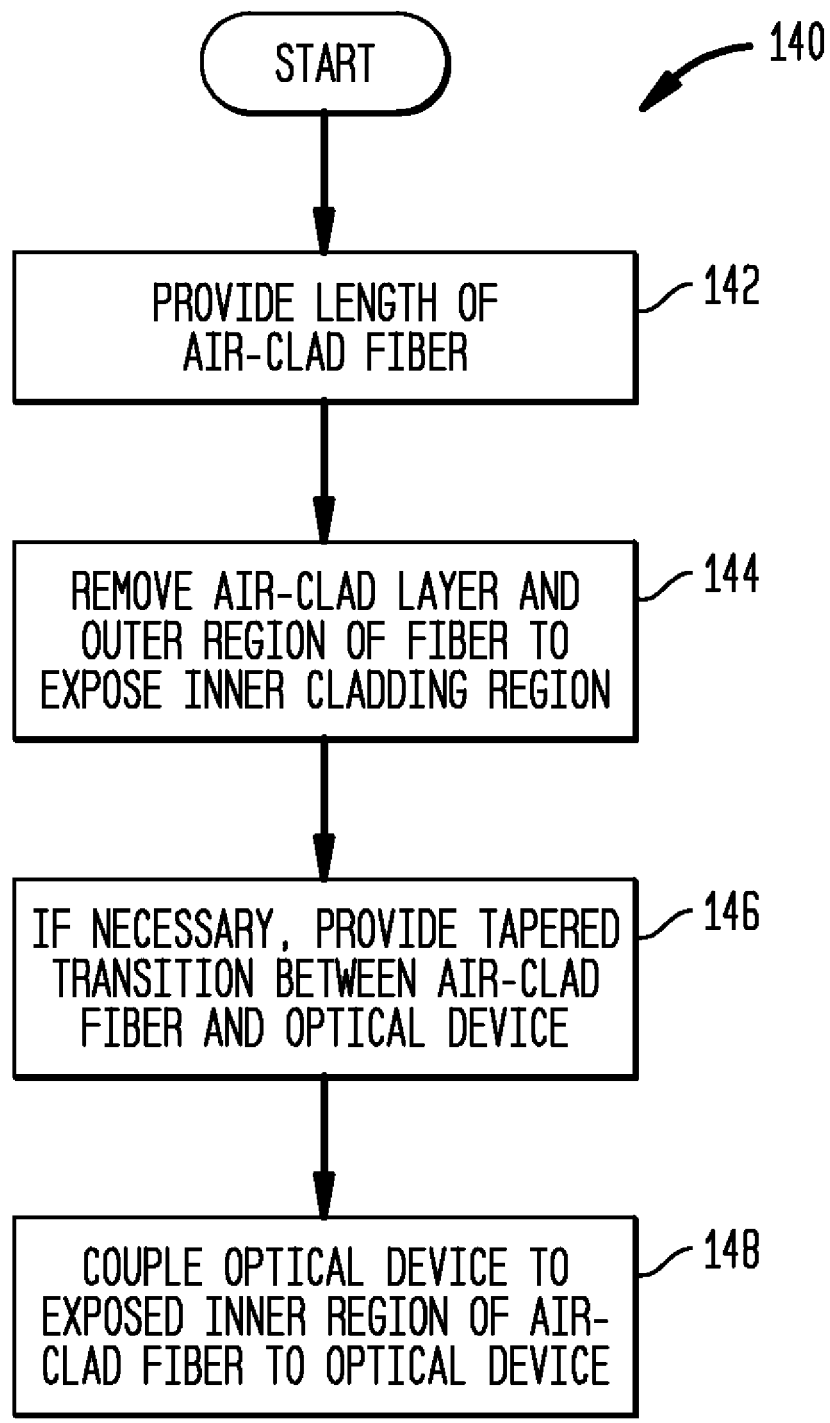
FIG. 7 shows a flowchart illustrating an overall method according to an aspect of the present invention for coupling an air-clad fiber to an optical device.

FIG. 7 shows a flowchart of an overall method 140 according to an aspect of the present invention, for coupling an air-clad fiber to an optical device, such as the fiber output of a TFB, or the like. In step 142, a length of air-clad fiber is provided. As described above, the air-clad fiber includes a core region, an inner cladding region, an air-clad region, and an outer fiber region. In step 144, the air-clad region and outer fiber region are removed, exposing the outer circumference of the inner cladding region. In step 146, a tapered transition is provided, if necessary, between the optical device and the air-clad fiber. In step 148, the optical device is coupled to the stripped portion of the air-clad fiber. As described below, the tapering described in step 146 may be performed before or after the coupling described in step 148.

Figure 8C:
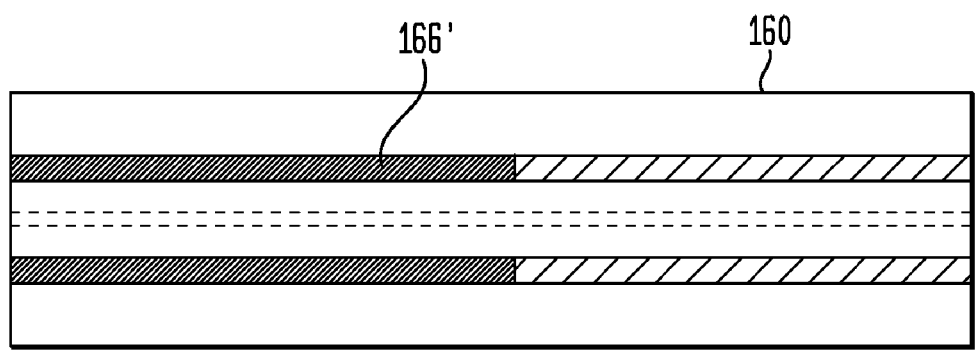

FIGS. 8A-8D show a series of cross section views illustrating a technique according to a further aspect of the present invention for preparing an air-clad fiber for coupling to an optical device. In FIG. 8A, a length of an air-clad fiber 160 is provided that includes a core region 162, an inner cladding region 164, an air-clad region 166, and an outer region 168. An etchant gas 170 is caused to stream through the air-clad region 166. A gas torch, or other suitable heat source, is used to apply heat 172 to a selected portion 174 of the fiber 160. The combination of the etchant gas 170 and the applied heat 172 causes the air-clad supporting structure to dissolve in the selected fiber portion 174, leaving an empty space, which is depicted as a blackened region 166' in FIG. 8B.

The treated fiber is then cleaved through the heated fiber portion. As shown in FIG. 8B, the fiber is cleaved at broken line 176, which is located at one end of the heated fiber portion. However, it would also be possible to cleave the fiber at another point in the heated fiber portion, such as through its midpoint. FIG. 8C shows a cross section diagram of the fiber 160 after cleaving.

Figure 8D:
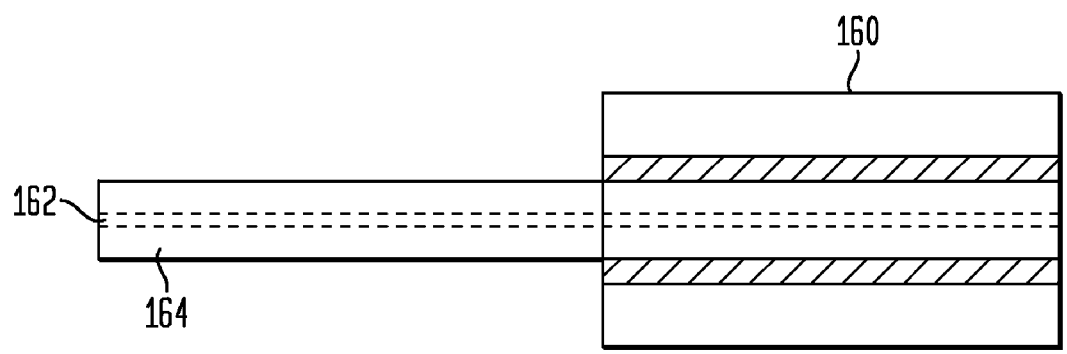

After cleaving, sandpaper is used to remove the outer region of the heated fiber region. Using sandpaper, it was possible to induce cracks in the outer region of the fiber without damaging the inner cladding region. FIG. 8D shows a cross section diagram of the air-clad fiber after removal of the fiber's outer region at its lead end.

The described technique was performed successfully using a mixture of oxygen and sulfur hexafluoride ($O_2/SF_6$) as the etchant gas, which was applied with a pressure of 5.0 bar at one end of a segment of air-clad optical fiber having a length of 1.5 meters. Sulfur hexafluoride was chosen as an etchant gas because it is "heat-activated." Sulfur hexafluoride is generally inert until it is heated to a temperature that is sufficiently high to cause a release of fluorine, which is an effective corrosive agent for etching away the air-clad structure in the heated portion of the fiber.

Other etchant gases may suitably be used, including hexafluoroethane ($C_2F_6$), or other fluorine-containing gases. These gases are also substantially non-corrosive to silica at room temperature, but when heated by a torch or other suitable heat source, release fluorine. Other gases having similar properties may also be suitable for use in the described technique.

The selected portion of the fiber was heated with a propane torch having a heating zone of approximately 3 cm. The heat was applied for 90 seconds, which was sufficient to cause the air-clad layer supporting structure to be etched away in the heated fiber portion. The structural integrity of the fiber components outside of the heated fiber portion were not significantly affected by the etchant gas. After removal of the air-clad layer and the outer fiber region, the exposed inner cladding region had a diameter of approximately 40 μm.

FIG. 9 shows a flowchart of a method 200 in accordance with the above described technique. In step 202, a length of air-clad fiber is provided. In step 204, an etchant gas is caused to stream down the length of the fiber through the air-clad region. In step 206, a selected portion of the fiber is heated to cause the air-clad supporting structure within the heated fiber portion to dissolve. In step 208, the fiber is cleaved through the heated region. Finally, in step 210, the outer region of the fiber is removed to expose the inner cladding region. It should be noted that in certain applications, such as in a side coupling context, it may not be necessary to cleave the fiber after heating.

It will be apparent from the above discussion that aspects of the present invention may be applied to any optical fiber containing a gas-conducting microstructure. For those optical fibers, it would be possible to etch away the gas-conducting microstructure in selected portions of the fiber, and to remove the outer fiber region as described above. This aspect of the invention is described in further detail below.

Other approaches may be used to remove the air-clad region and outer region of an air-clad fiber. These include, for example: using an etchant solution applied from the outside of the fiber, or via holes in the fiber, using an etchant gas applied from the outside of the fiber, laser ablation; and mechanical removal. The air-clad layer and outer region may also be removed after splicing, i.e., after the air-clad layer has collapsed. Some of all of these techniques may be useful for fibers having a microstructured region that is not gas-conducting.

After the outer region of the air-clad fiber has been removed, the resulting exposed inner cladding region will typically have a diameter that is significantly smaller than the lead end of the TFB or other optical device to which the air-clad fiber is to be coupled. It will therefore typically be necessary to taper the lead end of the TFB, or other optical device, down to the diameter of the stripped lead end of the air-clad fiber.

Figure 10A:
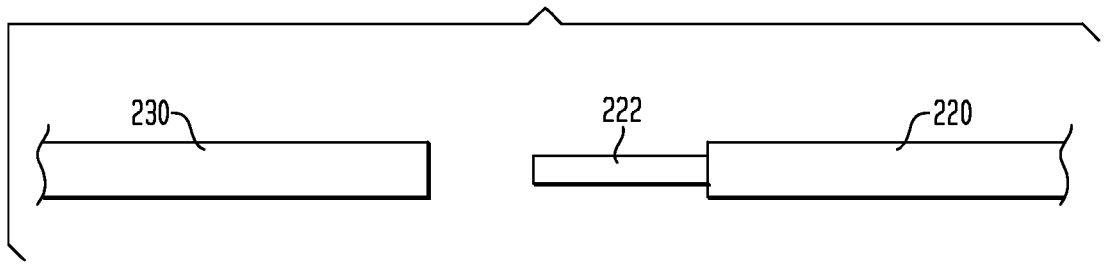
FIGS. 10A-10C are a series of diagrams illustrating a technique according to a further aspect of the invention for tapering the lead end of an optical device down to the diameter of the stripped lead end of an air-clad fiber.
Figure 10B:
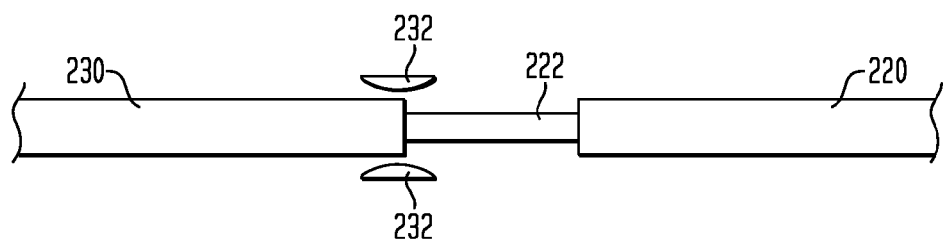
Figure 10C:
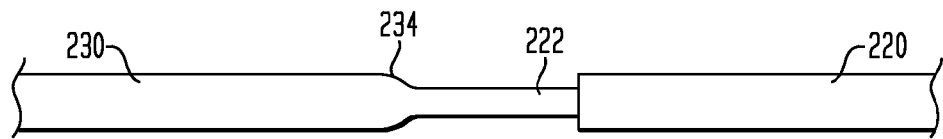

One tapering technique is illustrated in FIGS. 10A-10C. FIG. 10A shows an elevation view of an air-clad fiber 220 and a TFB 230. The air-clad fiber's lead end 222 has been prepared for splicing in accordance with the above-described techniques. As shown in FIG. 10A, the diameter of the air-clad fiber's lead end 222 is significantly smaller than the diameter of the TFB 230. In FIG. 10B, the air-clad fiber 220 has been spliced to the TFB 230. A post-splicing heat 232 is now applied. Because the diameter of the TFB 230 larger than that of the fiber end, surface tension causes a taper 234 to form at the fiber's end. It has been found that this taper results in a decrease in signal loss.

The technique illustrated in FIGS. 10A-10C was successfully performed in splicing an OFS air-clad fiber to a TFB having a diameter of 125 µm. After its outer region has been removed, the OFS air-clad fiber has a diameter of 40 µm. An Ericsson FSU995 splicer was used to fusion splice the air-clad fiber's lead end to the lead end of the TFB. The following optimized splice parameters were used:

| | |
|---|---|
| Pre-fusion time | 0.2 sec |
| Pre-fusion current | 8.0 mA |
| Gap | 40 µm |
| Overlap | 8.0 µm |
| Fusion time 1 | 0.3 sec |
| Fusion current 1 | 7.0 mA |
| Fusion time 2 | 2.0 sec |
| Fusion current 2 | 7.0 mA |
| Fusion time 3 | 0 |
| Fusion current 3 | 0 |

The fibers were joined together with the above splice program. The tapering was accomplished post-splice, by turning the arc on again with a current of 10 mA, using the service mode feature of the splicer. The arc was turned off when it was judged that the TFB was sufficiently tapered.

Because of its relatively short length, the taper achievable using the technique illustrated in FIGS. 10A-10C may be too lossy for a particular application. Thus, a further aspect of the invention provides a technique for increasing the length of the taper. According to this technique, a more gradual taper is created by soaking the lead end of the second fiber in a suitable etchant solution, such as a solution containing hydrofluoric acid (HF) at a suitable concentration. A taper is created in the fiber, for example, by moving the fiber with respect to the etchant solution to create a smooth decrease in fiber diameter between a portion of the fiber not soaked in the etchant solution and a relatively narrow fiber tip.

Other techniques may be used to taper the lead end of the TFB, or other optical device. For example, tapering of the TFB lead end may be accomplished by heating it to a temperature sufficient to cause it to soften, and then using a suitable mechanical device to apply tension to the fiber to stretch it into the desired tapered shape. This approach will affect the core diameter. However, the core properties of the TFB may be tailored to compensate for down-tapering. In that case, the desired modefield diameter for minimizing splice loss to an air-clad fiber is achieved only after the fiber has been physically down-tapered. Using a suitable mechanical tapering technique in combination with a suitable modefield diameter, it has been possible to increase efficiency to 88%.

Figure 11A:
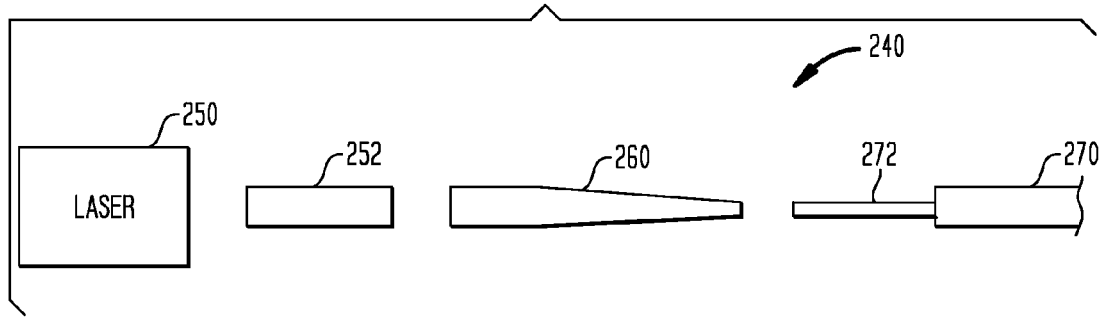
FIGS. 11A and 11B show, respectively, exploded and elevation views of a fiber coupling system according to a further aspect of the invention.
Figure 11B:
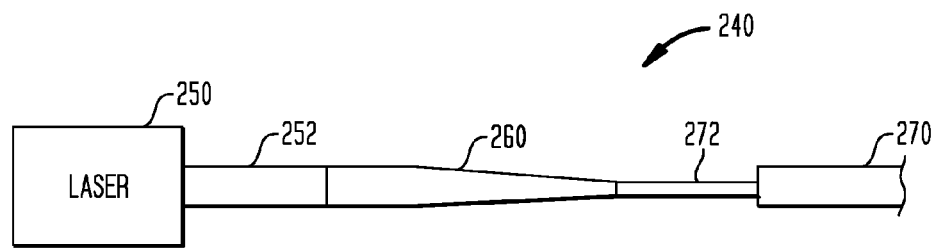

FIGS. 11A and 11B show, respectively, exploded and elevated views of a coupling scheme 240 according to a further aspect of the invention. The coupling scheme includes a 980 nm pumping laser 250, a tapered standard single-mode fiber (SSMF) 260, and an air-clad fiber 270. In the depicted coupling scheme, the laser output 252 has a core diameter of 105 µm, a cladding diameter of 125 µm, and a numerical aperture of 0.15. The tapered SSMF has a length of approximately 17 mm, and tapers down from a maximum diameter of 125 µm to a minimum diameter of 40 µm. The SSMF was tapered by dipping it in etchant solution, as described above. The air-clad fiber 270 has an outer waveguide with a diameter of 40 µm, and a numerical aperture of 0.50. The stripped portion 272 of the fiber has a diameter of 40 µm, and a length of approximately 3 mm. The splice between the laser output 252 and the SSMF 260 was performed using program 4 of the Ericsson FSU995 splicer. The splice between the SSMF 260 and the air-clad fiber's lead end 272 was performed using the program described above. The system shown in FIGS. 11A and 11B and described above had a measured efficiency of 66%. It is believed that the main loss was likely caused by contaminants on the bare surface of the tapered fiber. It is further believed that it would be possible to achieve increased efficiency by refining the technique used to taper the SSMF.

Figure 12:
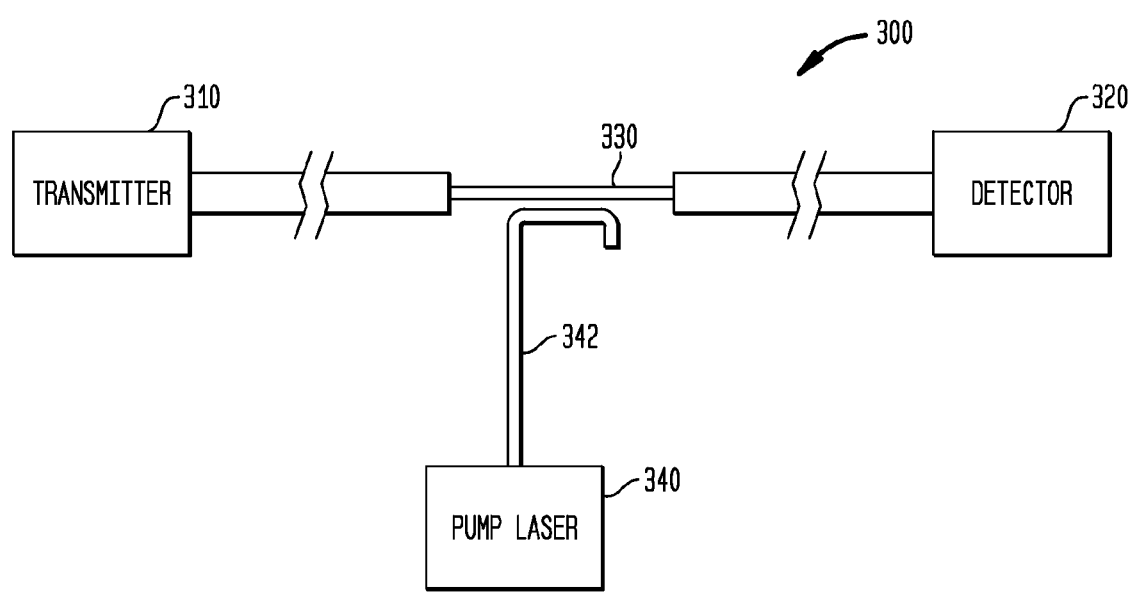
FIG. 12 shows a diagram of a pumping scheme in which a side coupling technique is used to couple a pump laser into an optical transmission line.

FIG. 12 shows a diagram of a coupling scheme 300, in which a side-coupling technique is used. The coupling scheme 300 includes a transmitter 310 and a detector 320. The optical link between the transmitter 310 and detector 320 includes an air-clad fiber having a stripped portion 330, prepared in accordance with the above-described techniques. The output of a pump laser 340 is transmitted by a pump fiber 342 that is glued or spliced to the side of the stripped portion of the air-clad fiber 330.

A TFB usually involves two or more fibers and thereby causes an increase in the numerical aperture of the pumping signal. Because a side-coupling scheme uses only a single fiber, a side-coupling scheme tends to lower the overall numerical aperture of the pumping signal.

As mentioned above, certain aspects of the above-described techniques are generally applicable to other types of fiber containing a microstructured region similar to the air-clad region in the air-clad fiber discussed above. FIG. 13 is a flowchart 400 illustrating a general technique according to a further aspect of the invention for etching away a selected portion of a microstructured region in an optical fiber. This technique is illustrated in FIGS. 8A-8D, discussed above.

In step 402, a length of optical fiber is provided having a microstructured region, such as the air-clad region in the air-clad fiber discussed above. Such microstructured regions typically comprise an internal microstructure including a plurality of microchannels extending down the length of the fiber. In step 404, a heat-activated etchant gas is caused to stream through a selected portion of the microstructured region. As discussed above, one way to perform step 404 is to feed an etchant gas into an open first end of the fiber, allow the gas to travel down the length of the fiber, and then allow the gas to escape out of an open second end of the fiber. In step 406, heat is applied to the selected portion of the microstructured region. As discussed above, one way to execute step 406 is to use a gas torch to apply heat to the optical fiber. The application of heat is step 406 causes a corrosive agent, such as fluorine, to be released from the etchant gas. In step 408 the corrosive agent is allowed to etch away the microstructure in the selected portion of the microstructured region. Finally, in step 410, if desired, the outer fiber region surrounding the etched-away microstructured region is removed to expose an inner fiber region. However, depending upon the particular application, it may be desirable to leave the outer region intact. In addition, if desired, the fiber may be cleaved through, or proximate to, the etched-away microstructured region.

The technique described above for the execution of step 404 is suitable for shorter lengths of optical fibers. However, because of the narrow diameter of the individual channels in typical microstructure regions, there tends to be a significant amount of resistance to gas flow. Thus, as the length of the fiber increases, it becomes increasingly difficult to cause the etchant gas to move through the selected fiber portion in the described manner.

Figure 14A:
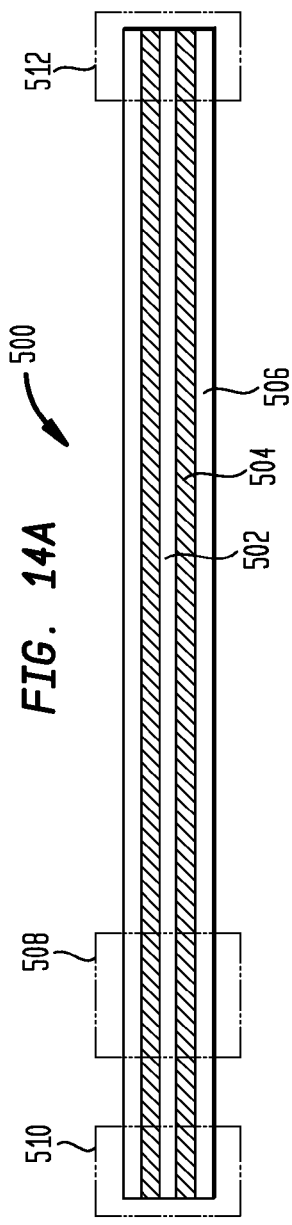
FIGS. 14A-C are a series of diagrams illustrating a technique according to a further aspect of the invention, in which there is created a backflow of etchant gas through a selected portion of a microstructured region in an optical fiber.
Figure 14B:
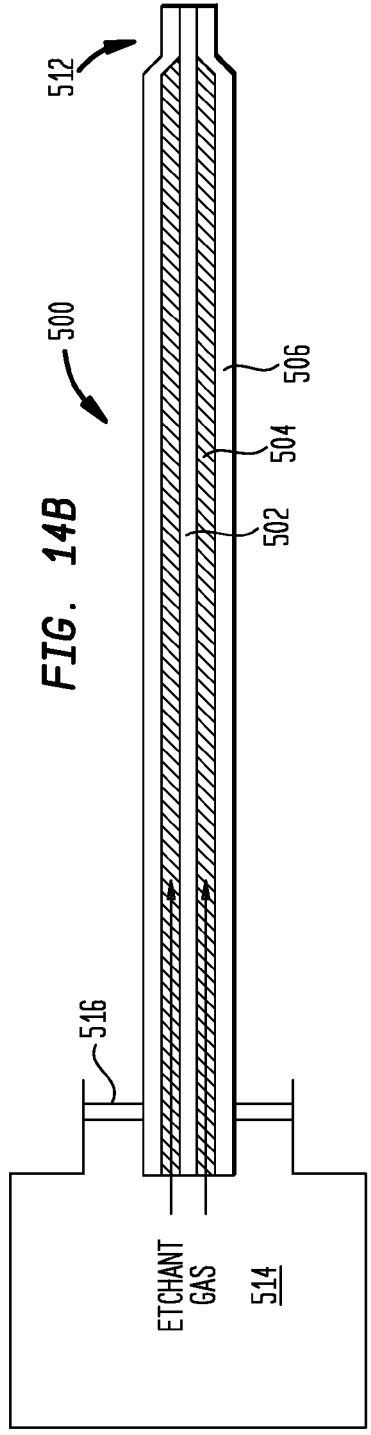
Figure 14C:
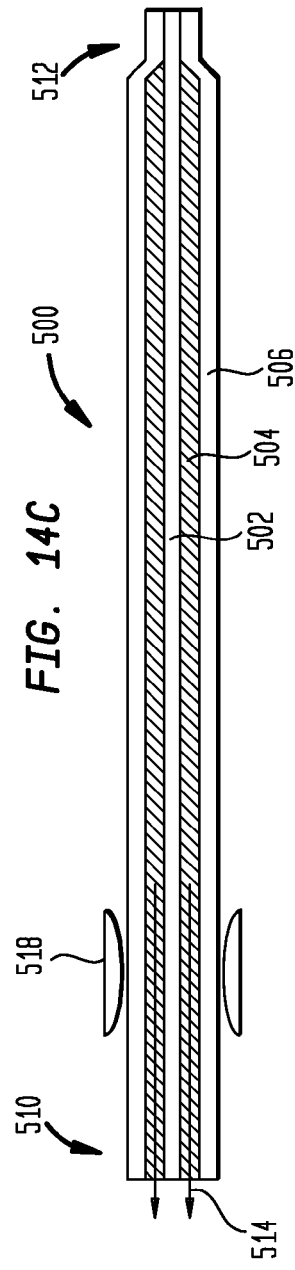

This issue is addressed by a further aspect of the invention, which provides an alternative technique for causing the etchant gas to flow through the selected region of the fiber. FIGS. 14A-C are a series of diagrams illustrating a technique according to this further aspect of the invention.

FIG. 14A shows a cross section diagram of an exemplary optical fiber 500 including an inner region 502, a microstructured region 504, and an outer region 506. It will be appreciated that although the depicted fiber 500 has only a single microstructured region 504, the presently described technique may also be used with an optical fiber having more than one microstructured region.

A portion 508 of the optical fiber 500 is selected, in which it is desired to remove the microstructure from the microstructured region, leaving an empty space. For the purposes of the present description, there are also identified a first end 510 and a second end 512. The first and second ends 510 and 512 are also referred to herein, respectively, as lead and tail ends.

According to the presently described technique, a portion of the fiber's microstructured region is sealed off, for example, by heating it to a temperature sufficient to cause the microstructure region to collapse, as illustrated in FIG. 5, discussed above. In FIG. 14B, the microstructured region 504 in the fiber's tail end 512 has been sealed off in this manner. It will be apparent from the present description that although an end of the fiber is sealed off in FIG. 14B, the microstructured region 504 may also be sealed off in a portion of the fiber 500 away from a fiber end.

As further shown in FIG. 14B, a suitable etchant gas 514, such as sulfur hexafluoride ($SF_6$) is pumped into the fiber's lead end 510, to a pressure that causes the gas 514 to be compressed within the portion of microstructured region 504 between the fiber's lead end 510 and the sealed-off portion 512. A suitable fitting 516 is used to couple the source of the etchant gas 514 to the fiber's lead end 510. As shown in FIG. 14C, when the fiber's lead end 510 is released, the compressed etchant gas 514 flows out of the fiber's lead end 510, resulting in a backflow of etchant gas 512 through the selected fiber portion 514.

The etchant gas 514 pumped into the closed-off fiber may achieve a pressure in the general range of 10-15 bars. Because of the relatively high resistance to flow, if the fiber has a length of 20-30 meters, it will typically take several minutes for the etchant gas 514 to leak completely out of the open end of the fiber. This provides ample time for performance of a heating operation, such as the technique illustrated in FIGS. 8A and 8B, in which heat 518 is applied to the selected portion of the microstructured region to cause the release of a corrosive agent from the etchant gas, which etches away the microstructure in the heated fiber portion.

As discussed above, after the microstructure has been etched away in the heated region, then the outer region can be removed, if desired. Alternatively, depending upon the particular application, it may be desired to leave the outer region intact. Also, the fiber may be cleaved through or proximate to the etched-away portion of the microstructured region.

The described technique has been found to be useful for fiber lengths of 20 meters or greater. However, it will be appreciated that the described technique may be performed using various lengths of fiber, including lengths shorter than 20 meters.

Further, it has been found that, if the microstructured fiber is of sufficient length, it is possible to create a backflow of etchant gas without blocking off a portion of the microstructured layer. As discussed above, there is a relatively high resistance to flow of the etchant gas through the microstructure down the length of the fiber. Therefore, if the fiber has sufficient length, if etchant gas is pumped into an open end of the microstructured fiber, pressure will build up inside of the microstructured region even if a portion of the microstructured layer has not been sealed off. When the lead end of the microstructured fiber is released, a backflow will be created because the rate at which the etchant gas escapes from the lead end of the fiber will be greater than the rate at which the etchant gas continues to propagate down the length of the fiber. It has been found that a suitable backflow may be created using a microstructured fiber having a length of 30 meters or greater. It would be possible, for example, to practice the described technique at the lead end of an optical fiber wound onto a bulk spool.

FIG. 15 shows a flowchart 600 illustrating the above-described techniques. In step 602, an etchant gas is fed into the microstructured layer of a microstructured fiber through a lead end of the fiber. In step 604, the pressure of the etchant gas is allowed to build up in the microstructured region. Finally, in step 606, the lead end of the fiber is released, thereby causing a backflow of etchant gas through a selected portion of the microstructured region. As discussed above, depending upon the length of the fiber, it may or may not be necessary to block off a portion of the microstructured region to allow the pressure of the etchant gas to build up.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for coupling together an air-clad optical fiber and an optical device, comprising:
   (a) providing an air-clad optical fiber having a core region, an inner cladding region surrounding the core region, an air-clad region surrounding the inner cladding region, and an outer region surrounding the air-clad region;
   (b) preparing a portion of the air-clad optical fiber for coupling by removing therefrom the air-clad region and the outer region, leaving an exposed inner cladding region; and
   (c) coupling the optical device to the exposed inner cladding region.

2. The method of claim 1, wherein the air-clad region of the air-clad optical fiber comprises a gas-conducting support structure, and wherein step (b) further includes:
   causing an etchant gas to stream through the support structure;
   heating a portion of the fiber to cause the etchant gas to etch away the support structure in the heated fiber portion; and
   after the support structure has been etched away in the heated fiber portion, removing the outer region therefrom, leaving an exposed inner cladding region.

3. The method of claim 2, wherein the etchant gas comprises a mixture of oxygen and sulfur hexafluoride.

4. The method of claim 1, wherein the air-clad region and outer region of the air-clad fiber are removed by laser ablation.

5. The method of claim 1, wherein the air-clad region and outer region of the air-clad fiber are removed from by applying an etchant gas to the outside of the fiber.

6. The method of claim 1, wherein the optical device is a tapered fiber bundle.

7. The method of claim 1, wherein the optical device is coupled to a side of the exposed inner region of the air-clad optical fiber.

8. The method of claim 1, wherein the optical device is a second air-clad optical fiber.

9. The method of claim 1, wherein a lead end of the exposed inner region of the air-clad fiber is spliced to a lead end of an optical device having a larger diameter, the method further including:
   providing a tapered transition between the lead end of the exposed inner region of the air-clad fiber and the lead end of the optical device.

10. The method of claim 9, further including:
    after splicing together the lead end of the exposed inner region of the air-clad fiber and the lead end of the optical device, using heat and surface tension to create a tapered transition.

11. The method of claim 10, wherein the heat is applied by a fusion splicer.

12. The method of claim 10, wherein the heat is applied by a flame.

13. The method of claim 10, wherein the heat is applied by a laser.

14. The method of claim 9, wherein the tapered transition is created by soaking a lead end of the optical device end in an etchant solution.

15. The method of claim 14, wherein the etchant solution contains hydrofluoric acid.

16. The method of claim 9, wherein the tapered transition is created by heating the lead end of the optical device to soften it and then pulling it into a tapered shape.

17. The method of claim 16, further including designing the core of the optical device fiber such that a desired core for the optical device is achieved after the optical device has been tapered.

18. A method for preparing an optical fiber for coupling to an optical device, comprising:
    (a) providing a length of an optical fiber including a microstructured, gas-conducting region, and an outer region positioned outside of the periphery of the microstructured region;
    (b) causing an etchant gas to stream through the microstructured region;
    (c) applying heat to a selected portion of the fiber such that the combination of the etchant gas and the applied heat causes the microstructured region to be etched away in the heated fiber portion; and
    (d) removing the outer region of the fiber in the heated region of the fiber.

19. An optical pumping system, comprising:
    an air-clad fiber, having a core region, an inner cladding region, an air-clad region, and an outer region, the core region and inner cladding region interface forming an inner waveguide for transmitting an optical data signal, and the inner cladding region and air-clad region interface forming an outer waveguide for transmitting an optical pumping signal,
    the air-clad fiber including a stripped region, from which has been removed the air-clad region and outer region, such that the outer waveguide is preserved; and
    coupling means for coupling a pumping laser to the outer waveguide of the stripped region of the air-clad fiber.

20. The optical pumping system of claim 19, wherein the coupling means comprises a tapered fiber bundle.

21. A method for etching away at least part of a microstructure from a selected portion of a microstructured layer in an optical fiber, comprising:
    (a) providing a length of optical fiber having a microstructured layer;
    (b) causing a heat-activated etchant gas to stream through a selected portion of the microstructured layer;
    (c) applying heat to the selected portion of the microstructured layer to cause a corrosive agent to be released from the etchant gas; and
    (d) allowing the corrosive agent to etch away the microstructure in the selected portion of the microstructured layer.

22. The method of claim 21, wherein step (b) includes:
    feeding the etchant gas into the microstructured layer at a first end of the optical fiber;
    allowing the etchant gas to stream through the microstructured layer down the length of the optical fiber; and
    allowing the etchant gas to escape out of the microstructured layer at a second end of the optical fiber.

23. The method of claim 21, wherein step (b) includes:
    feeding an etchant gas into a lead end of the optical fiber;
    allowing pressurized etchant gas to accumulate in the microstructured layer; and
    releasing the lead end of the optical fiber, thereby resulting in a backflow of etchant gas through the microstructured layer.

24. The method of claim 23, further including:
blocking a portion of the microstructured layer; and
allowing pressuring etchant gas to accumulate between the lead end of the optical fiber and the blocked portion of the microstructured layer.

25. The method of claim 23, further including:
providing a segment of optical fiber having a sufficient length such that when an etchant gas is pumped into a lead end of the optical fiber and pressurized etchant gas is allowed to accumulate in the microstructured layer, a backflow of etchant gas results when the lead end of the optical fiber is released.

26. The method of claim 21, further including:
(e) removing an outer region of the optical fiber surrounding the etched-away portion of the microstructured layer.

* * * * *